United States Patent [19]

Anderson

[11] Patent Number: 4,682,784

[45] Date of Patent: Jul. 28, 1987

[54] WHEELCHAIR WITH VARIABLE RATIO PROPULSION

[76] Inventor: Jack E. Anderson, 17787 Owen St., Fontana, Calif. 92335

[21] Appl. No.: 864,472

[22] Filed: May 19, 1986

[51] Int. Cl.[4] .............................................. B62M 1/14

[52] U.S. Cl. ............................ 280/242 WC; 280/244; 280/246; 280/238

[58] Field of Search ............... 280/242 WC, 236, 238, 280/244, 246, 255, 258; 24/416

[56] References Cited

U.S. PATENT DOCUMENTS

| | | | |
|---|---|---|---|
| 4,005,611 | 2/1977 | Jeffries | 280/236 |
| 4,354,691 | 10/1982 | Saunder et al. | 280/242 WC |
| 4,358,126 | 11/1982 | Mitchell et al. | 280/242 WC |
| 4,447,068 | 5/1984 | Brooks | 280/238 |

*Primary Examiner*—David M. Mitchell

*Assistant Examiner*—Donn McGiehan

*Attorney, Agent, or Firm*—Harvey S. Hertz

[57] ABSTRACT

A wheelchair hand propelled by the occupant. Levers on the sides in juxtaposition with the main wheels of the wheelchair are rotatable in the forward-backward direction about the main wheel axle as a fulcrum. A plurality of concentric ratchet rings affixed to each of the main wheels provides engagement for a discrete one of a plurality of pawls associated with each of the levers. The plurality of pawls is distributed progressively circumferentially about a shaft associated with each of the levers, and means are included to rotate the shaft to bring a discrete one of the pawls into operative relationship with a selected one of the concentric ratchet rings, thereby providing a selectable propulsion ratio. The ratchet teeth are oriented such that the pawls slide over them when the levers are pulled backward, but engage firmly when the levers are thrust forward.

20 Claims, 7 Drawing Figures

FIG. 5
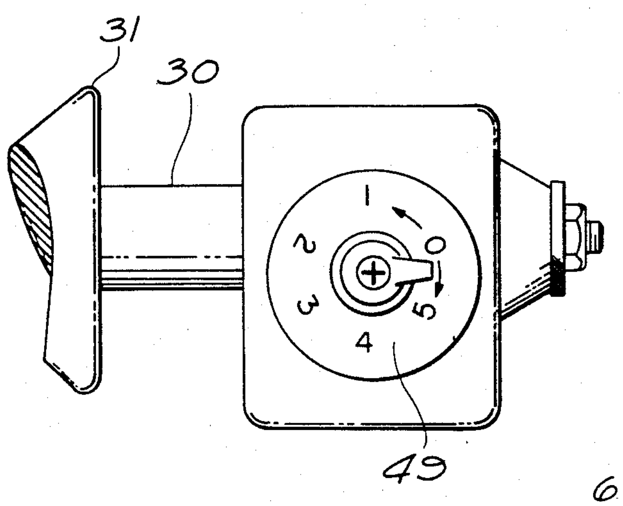
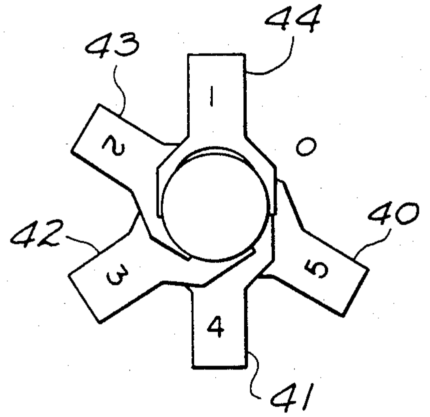
FIG. 6
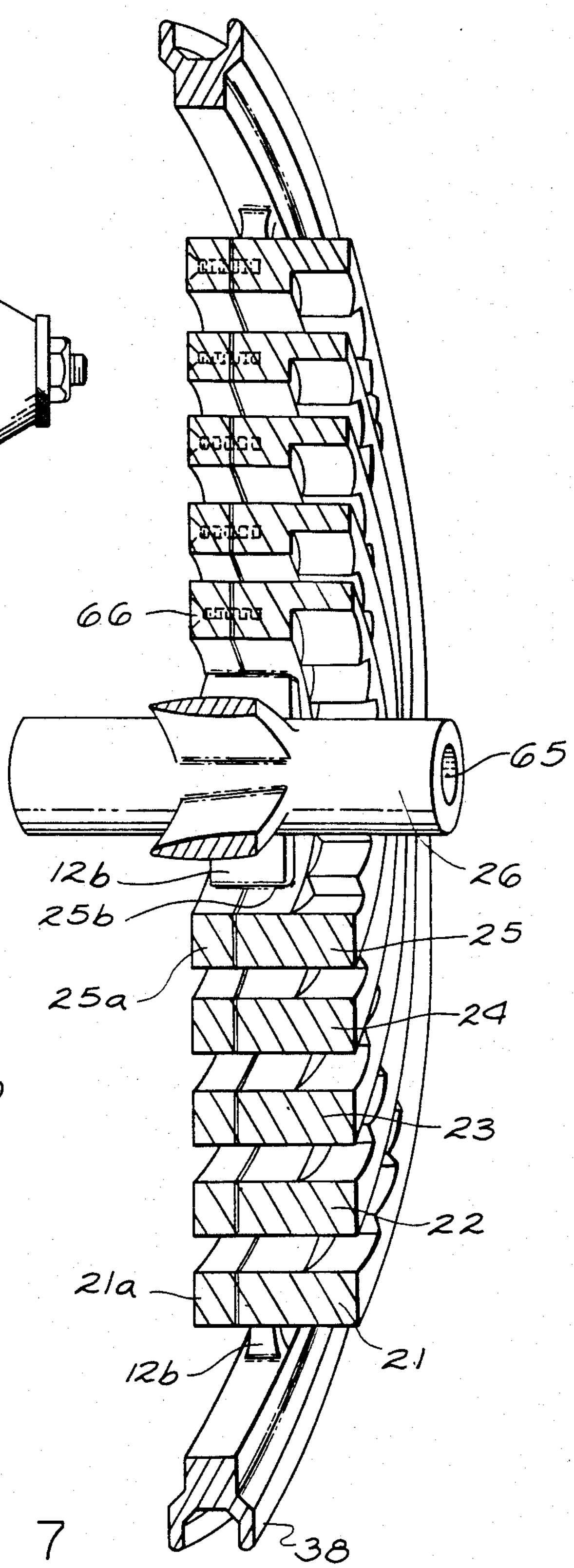
FIG. 7

WHEELCHAIR WITH VARIABLE RATIO PROPULSION

BACKGROUND OF THE INVENTION (1) Field of the Invention

The invention relates generally to wheelchairs, and more particularly to lever-propelled wheelchairs providing variable mechanical advantage for various terrain and use conditions.

(2) Description of the Prior Art

In the prior art, the usual situation respecting the user of a wheelchair is recognized, i.e. that the user has little or no leg strength, but does have arm and upper torso strength such that propulsion can be effected through operation of hand levers. Moreover, the prior art discloses various gear-shifting arrangements to accommodate various terrain, slopes and other conditions.

Bicycles with variable drive ratios have long been known, mostly with chain drive and multiple sprocket wheels among which the chain is positioned for drive ratio changing. A few variations for bicycle drive ratio control using gear drives or combinations of gear and chain drives are known. U.S. Pat. Nos. 3,863,503 and 614,969 show forms of the first named variation and U.S Pat. No. 3,948,542 describe the second. Of course, bicycles are always foot pedal driven devices by their nature and, therefore, their various structural arrangements are quite different, vis-a-vis the arrangement of the invention herein to be described and not adaptable thereto.

The prior art terms "velocimon" and "velocipede" have been used to describe the types of user powered vehicle which generally includes the various wheelchair arrangements extant. The user powered wheelchair as a specialized vehicle of the class usually includes hand levers pumped forward and backward or a handwheel laterally outward from, but generally concentric with, the main or groundwheels of a wheelchair.

The variations extant include shiftable gear drives between the activating levers or hand wheels and the driver axles of the main (ground) wheels and chair and sprocket or belt and fully torque/speed modifiers. U.S. Pat. Nos. 3,917,311 and 605,530 are typical of invalid vehicles of those types.

In U.S. Pat. No. 390,174 and published European Patent application publication No. 4,205 (filed Mar. 14, 1979), the concept of coupling propulsion force into a ratchet (toothed) wheel from hand pumped levers by means of pawls associated with the levers is disclosed. The ratchet wheels connect to gear assemblies in the aforementioned U.S. Pat. No. 390,174 and more or less directly to the axles of the main wheels in the device of the European patent application, but no "gear-shifting" capability is included.

Any arrangement of gears inherently introduces friction losses which reduce the efficiency of the overall transmission. Moreover, gear arrangements are relatively expensive to manufacture to close tolerance as needed to minimize such friction losses. Still further, incorporation of gear transmissions increases the weight of the vehicle and, therefore, the difficulty of propelling it.

The manner in which the invention eliminates the prior art disadvantages and advances the state of the art will be understood as this specification proceeds.

SUMMARY OF THE INVENTION

In consideration of the state of the prior art and its disadvantages, it may be said to have been the general object of the invention to provide a vehicle of the user powered wheelchair type which is relatively light, is relatively easily and inexpensively manufactured and, above all, provides a high efficiency driving force transmission in each of a plurality of transmission ratios.

The large (driven) wheels of the wheelchair according to the invention each have a plurality of rigid radial spokes to which a plurality of concentric ratchet rings are attached. These rings include a sawtooth pattern along a circumferential surface and have a depth laterally (axially with respect to the axle of the driven wheels), which is sufficient to permit a relatively large area of contact vis-a-vis a pawl in contact with the sawtooth surface. In addition to their mutual concentricity, the rings are also concentric with respect to the axle of the driven wheels. The sawtooth surfaces of the rings are preferably on the inner circumferential surfaces (facing the aforementioned axle), although it will be realized that the said sawtooth surface could be on the radially outward circumferential surfaces of the rings.

A pair of levers each pivoted about the driven wheel, one on each side of the wheelchair, extend generally upward and have handles which the wheelchair user can grip to pump the levers back and forth for propulsion.

A plurality of pawls, placed in angularly staggered patterns about shafts within the levers, can be rotationally positioned from a control arrangement associated with the lever handles.

The pawls are also spaced lengthwise along the shafts to correspond to the concentric ratchet ring radial spacing, so that only one pawl is operatively associated with a corresponding ratchet ring at any time, and rotation of the shaft to bring another pawl into use against its corresponding ring, effects a propulsion ratio charge.

The orientation of the radial surfaces of the sawtooth pattern is such that propulsion results when the user pushes forward on the lever handles, this being a mode in which the user's body is backed by the wheelchair seat back. The most effective force is thereby applied to the levers. Ratched ring sawteeth have a ramp portion oriented so that, on drawback of the levers, the pawls slide over the teeth to reset to a new position against the generally radial sawtooth faces for the next propulsion cycle.

The details of a preferred embodiment according to the invention will be understood as this description proceeds.

BRIEF DESCRIPTION OF THE DRAWINGS

FIG. 5 is a top view of one of the propulsion levers showing the propulsion ratio indicator.

FIG. 6 is a top view of the circumferential spacing of the pawls distributed about the shaft within each of the propulsion levers.

FIG. 7 is a cut-away view of a wheel of the assembly with the ratchet rings in place.

DETAILED DESCRIPTION

Figure 1:
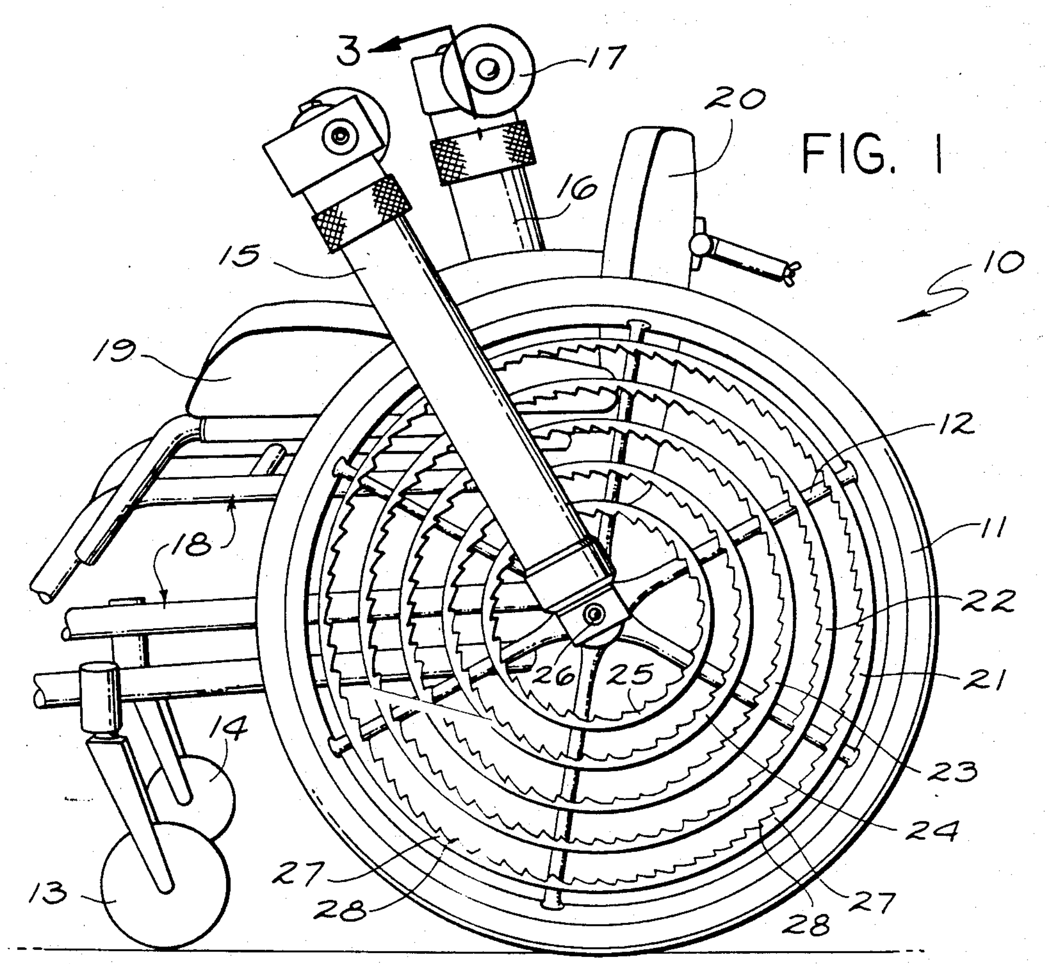
FIG. 1 is a lateral view of a wheelchair embodying the ratchet ring and pawl structure according to the invention.

Referring now to FIG. 1, a typical wheelchair 10 with rigid spoke driven wheels, typically 11 (at the users left side) is shown. The rigid spokes are illustrated typically at 12. Two smaller swivelling forward wheels 13 and 14 are typical of wheelchairs, although it will be realized that for purposes of a complete assembly incorporating the invention, a single forward wheel might be employed in lieu of wheels 13 and 14. Propulsion levers 15 and 16 are shown with generally horizontal portions supporting rotatable hand grips (typically 17 on the lever 16 at the users right side).

Frame members of the wheelchair are of conventional, high-strength tubing, for example at 18. A conventional seat and backrest, 19 and 20 respectively, are rigidly affixed to the frame members 18 in a well-known manner.

Ratchet circular rings 21, 22, 23, 24 and 25 are shown in a mutually concentric arrangement, radially spaced from the axle 26 (the outer end of which is visible in FIG. 1). These rings 21–25 are also concentric about the axle 26, and it is to be understood that a like arrangement is extant on the other wheel (at the users right).

The rachet teeth in the ratchet rings are sawtooth shaped, each having a circumferentially continuous sawtooth surface facing toward the axles. These sawteeth identified typically on ring 21 have radial portions 27 and ramp portions 28. An engaging pawl, (one of a selectable plurality), engages this sawtooth pattern of one of the ratchet rings of each driven wheel under control of the user such that forward and backward pumping action of the levers 15 and 16 applies torque to the wheels as a function of the factor determined by the lever length divided by the axle to selected ring dimension.

It will be realized from inspection of FIG. 1 that forward thrust of levers 15 and 16 causes the selected pawl associated therewith to engage the radial sawtooth surface 28 to drive the wheelchair forward, whereas the rearward action of the levers results in the pawl sliding over the ramp portion of the ratchet sawtooth pattern (typically 27). The details of the structure of this ratchet arrangement will be more fully understood as this description proceeds.

It will be understood that reversal of the ramp and radial surfaces of the sawtooth pattern would produce forward wheelchair motion on the backward lever thrust, and such a variation is, of course, possible. However, it has been found that the forward lever thrust mode is preferred, (consistent with the illustration), since the user is thereby effectively backed up by seat back 20, It is also to be noted that the leg strength and reactive force required for an effective lever backward stroke is probably not available to a wheelchair user.

The surfaces of the rings bearing the sawtooth ratchet pattern are shown facing inward toward the axle 26. These surfaces are hereafter referred to as circumferential intervening surfaces. Obviously, each ring has two such surfaces, one toward axle 26 and the other toward the wheel periphery. The latter surface is a possible location for the sawtooth surface. However, the arrangement illustrated is preferred since engagement of the pawl in use is not opposed by centrifugal force.

Figure 2:
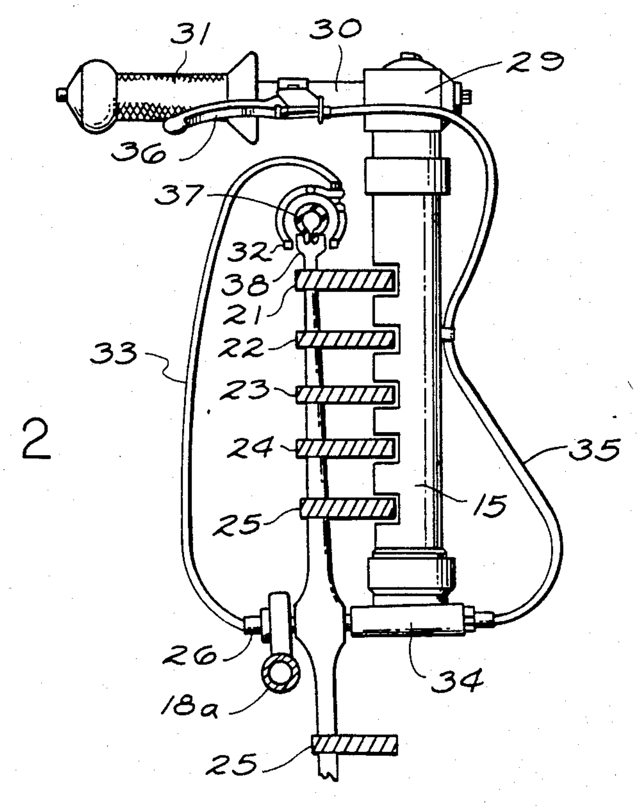
FIG. 2 is a view of the right side lever and handle arrangement as related to the ratchet rings visible in FIG. 1.

Referring now to FIG. 2, the lever assembly 15 on the users left is shown (viewed from the front of the wheelchair). The ratchet rings 21–25 are sectioned by a plane passing through the lever 15 generally parallel to its centerline. Structural (tubular) member 18*a* is also sectioned by the same plane. It is at this location that the entire wheel 11, lever 15 and associated parts are attached to the wheelchair frame.

It will be evident from FIG. 2 that the ratchet rings are of substantially greater dimension in the laterally outward direction, (parallel to axle 26), than they are in the wheel radial dimension. The reason for this will be more evident from FIG. 3 following.

Slots through the wall of the tubular lever 15 permit the edges of the ratchet rings to be in close communication with the pawl assembly on a separate shaft therein as will be more evident as this description proceeds.

Hollow tubular lever member 15 communicates with a generally horizontal second tubular member 30 through a hub 29, and a hand grip 31 is normally free turning about the perimeter of tube 30 so that it can rotate the few degrees required during the aforementioned lever pumping action.

A brake of the type quite familiar in the bicycle field is provided for completeness. The brake is of the caliper type 32 surrounding the wheel tire 37 substantially at top of each driven wheel such as 11, for example. When the brake lever 36 is squeezed toward the hand grip 31, the caliper 32 grips the rim 38 of wheel 11 by the force transferred via cable 33 and 35 through the bore of hollow axle member 26, and journal 34, respectively.

Figure 3:
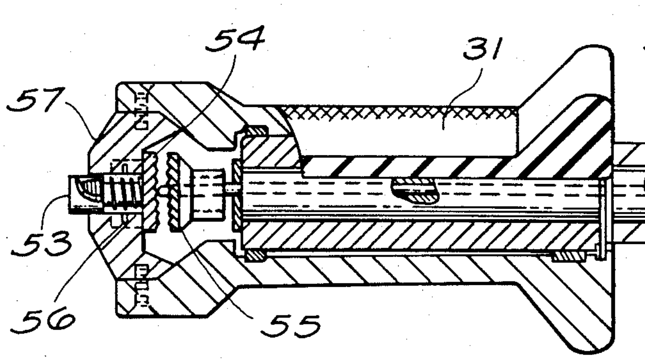
FIG. 3 is a partially sectioned view of the lever and handle of FIG. 2 taken as indicated on FIG. 1.
Figure 3:
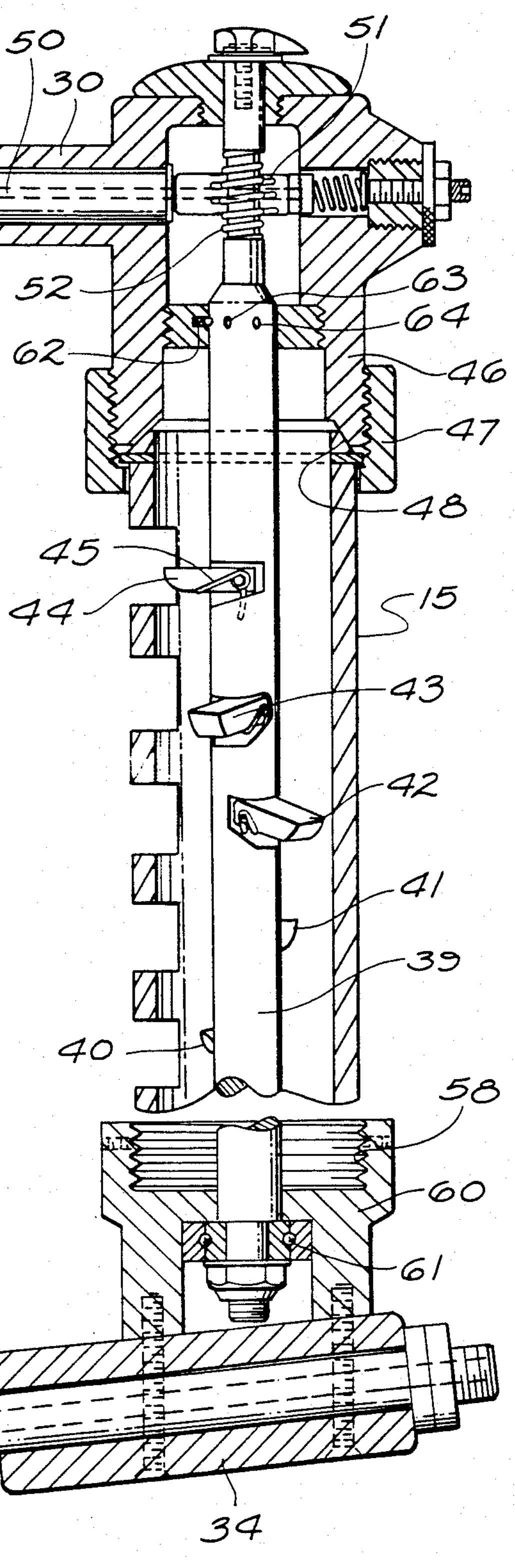

Referring now to FIG. 3, a sectioned view of the typical lever and second hollow tubular member 30 is shown along with the related functional parts.

Within hollow lever 15, a first shaft 39 is mounted. Each of the pawls 40, 41, 42, 43, and 44 is mounted in a recess in the body of shaft 39. Each of these pawls 40–44 is mounted with limited rotational freedom about a pin through a portion of the shaft 39. This rotational freedom allows the extended tip of each pawl to ride over the ramp portion of the corresponding ratchet ring sawtooth surface on a reset pumping motion of levers 15 and 16 or be biased by spring 45 (typically), against the face, (typically 28), or radial surface of the sawtooth for a propulsion stroke.

The nut 47 threaded onto upper body section 46 serves to mate that body section 46 to the chamfered upper end of tubular lever member 15 so that lever member 15 and hollow tubular member 30 move as a unit in response to hand applied propulsion thrust laterally at hand grip 31.

The circumferential distribution of the pawls 40–44 about shaft 39, (see FIGS. 3 and 6), serves to place only one pawl in operative relationship with a corresponding ratchet ring at any time, the selection process being a function of the angular position of shaft 39 as indicated visually (for the user's benefit) at the dial 49 (FIG. 5).

The second shaft 50 is rotationally positionable within second tubular member 30 and couples its rotation to shaft 39 via the gears 51 and 52 as is apparent in FIG. 3. The hand grip 31 is temporarily locked to shaft 50 when button 53 is pressed in to engage flat gears 54 and 55. The shaft of button 53 is keyed to end cap 57 which is fixed to grip 31, so that rotation of grip 31 with button 53 depressed, transfers the rotation of gear 31 to flat gear 55 and, therefore, to shaft 50. The selection of torque ratios thereby effected may be observed at dial 49. This process may be likened to shifting gears.

Figure 4:
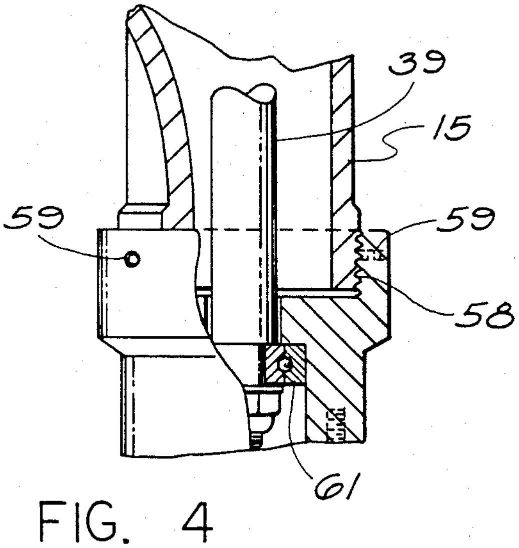
FIG. 4 is a partial cut-away view of the face support of the lever assembly of FIG. 3 adjacent to the axle of the main wheels of the assembly.

Since, FIG. 3 is not complete as to attachment of tubular lever 15 to the lower collet 60, FIG. 4 is presented to show threaded engagement 58, set screws 59 and lower ball bearing 61.

Referring again to FIG. 3, an optional detent arrangement is shown in the form of dimples 63 and 64 in the surface of shaft 39 and a spring loaded ball detent at 62 shown mated into another dimple left of 63.

The axle journal 34 is shown in FIG. 3 at an optional angle other than 90 degrees with respect to the lever 15 centerline. That angular offset serves to cant the lever 15 slightly from the vertical for added clearance near the wheel at the top (see FIG. 2). Of course, this may necessitate variable ratchet wheel dimensions as a function of distance from the axle 26. The bore 65 through axle 26 accommodates the brake cable as suggested in FIG. 2.

In FIG. 7 more detail of the ratchet rings construction is presented. FIG. 7 reveals that the rigid spokes of the wheelchair main wheels taper from their roots (such as at 12*a*, for example) to a smaller cross-section at 12*b*. This is a conventional feature of such spokes.

The ratchet rings are illustrated in FIG. 7 in accordance with one method of attaching them to the wheel spokes. In this structure, the ratched wheels are broken into mating parts, such as 21 and 21*a*, which have slots therein (such as 25*b*) appropriate for the cross-section of the spoke at that wheel radial location.

The two parts of each ratchet ring may then be attached, for example by screws as shown at 66.

It will be evident that the apparatus of the invention entirely avoids the frictional burden inevitable in actual geared variable ratio transmissions. It will also be realized that production techniques for minimizing costs are readily applicable. For example, the ratchet rings may be formed as castings from relatively hard metal. Alternatively, these rings may be best treated (case hardened, for example) after casting. Close tolerances are not required at any point in the structure.

Suitable materials for all parts of the structure are readily chosen by the practitioner of ordinary mechanical engineering skill.

Modifications other than those already suggested in this specification will suggest themselves to those skilled persons once the basic concepts of the invention are fully appreciated. Accordingly, it is not intended that the scope of the invention should be regarded as limited by the drawings or this description, these being illustrative and typical only.

I claim:

1. A user propelled wheelchair or the like having a pair of relatively large driven wheels each mounted on and independently rotatable about an axle supported by the frame of said wheelchair, comprising:

first means including a plurality of concentric ratchet rings rigidly mounted in radially spaced relationship on said wheels;

second means including a pair of levers pivoted about said axles, one of said levers being installed or each side of said wheelchair for propelling said wheelchair by backward and forward pumping action of said levers;

third means including a plurality of pawls associated with each of said levers, said pawls being arranged such that only one pawl is operatively associated with a corresponding one of said ratchet rings at any one time, said ratchet rings having a sawtooth surface pattern such that said operative pawl slides over said ratchet ring during one directional sense of said lever pumping action and engages said sawtooth surface to impart a torque thereto during the other sense of said long pumping action; and user controlled means for selecting the one of said pawls in operative relationship with a corresponding ratchet ring for effecting change of the torgue ratio between said levers and said driven wheels.

2. In a user propelled wheelchair having a pair of relatively large driven wheels, one on each side of said wheelchair and each mounted on a separate axle supported from the frame of said wheelchair, the combination comprising:

a plurality of concentic, radially spaced ratchet rings rigidly affixed to each of said wheels;

a pair of propulsion levers, one lever pivoted about said axle on the corresponding side of said wheelchair, to impart torque to said wheels in response to a cycle of forward and backward pumping motions of said levers;

means including a plurality of pawls associated with said levers, said pawls being spaced along the length of said lever by an amount corresponding to the radial spacing of said ratchet rings; said pawls further being oriented in the circumferential dimension of said levers such that only one pawl is operatively associated with a corresponding ratchet ring on each of said driven wheels at any time;

and user controlled means to select the one of said pawls in operative association with said corresponding ratchet wheel on each of said driven wheels, thereby to provide user control of the torque transfer ratio between said levers and said driven wheels.

3. A user powered wheelchair having a pair of relatively large driven wheels each mounted for independent rotation on an axle, comprising:

a plurality of radially spaced, mutally concentric rings concentric with said axle, said rings being rigidly mounted on each said wheels;

a continuous sawtooth surface about a circumferential intervening surface between each of said rings;

a propulsion lever pivoted on one end about said axle for each of said wheels and extending generally upward, said levers having handles at their upward ends;

a first shaft rotatably mounted on and in generally parallel relationship with the centerline of each of said levers, and a plurality of pawls mounted on said shaft in a circumferentially staggered pattern and uniformly spaced along the length of said shaft to correspond to said radial spacing of said rings, said sawtooth surfaces having substantially radial edges for engaging one of said pawls to impart motion to said wheels when said lever and shaft are thrust forward, said sawtooth surfaces further having ramp surfaces between adjacent radial edges to permit said pawls to ride thereover when said lever is drawn backward by said user.

4. The combination set forth in claim 3 further including user controlled means for selecting the rotational position of each of said shafts to place a selected one of said pawls in operative relationship with said sawtooth surface of a corresponding one of said concentric rings, thereby selecting a desired ratio of incremental angular rotation of said wheels to incremental angular travel of said levers.

5. The combination set forth in claim 3 in which said driven wheels have rigid spokes, said concentric rings have a dimension parallel to said axles greater than their radial thickness dimension and means are included for rigidly attaching said rings adjacent to their laterally inward portions to said spokes.

6. The combination set forth in claim 4 in which said driven wheels have rigid spokes, said concentric rings have a dimension parallel to said axles greater than their radial thickness dimension and means are included for rigidly attaching said rings adjacent to their laterally inward portions to said spokes.

7. The combination according to claim 5 in which said sawtooth surface extends from the laterally outward extremity of said rings inward within the axial direction of said rings by a predetermined amount toward said rigid spoke attachment.

8. The combination according to claim 3 in which said levers are hollow tubes and said first shafts are rotatably mounted within each of said hollow tubes, said hollow tubes being circumferentialy slotted to permit radially inward protrusion of the edges of said ratchet wheels therethrough into operative relationship with a corresponding one of said pawls.

9. The combination according to claim 4 in which said levers are hollow tubes and said first shafts are rotatably mounted within each of said hollow tubes, said hollow tubes being circumferentialy slotted to permit radially inward protrusion of the edges of said ratchet wheels therethrough into operative relationship with a corresponding one of said pawls.

10. The combination according to claim 7 in which said levers are hollow tubes and said first shafts are rotatably mounted within each of said hollow tubes, said hollow tubes being circumferentialy slotted to permit radially inward protrusion of the edges of said ratchet wheels therethrough into operative relationship with a corresponding one of said pawls.

11. The combination set forth in claim 8 in which said first shafts are located substantially at the centerline of each of the corresponding hollow tube of each of said levers.

12. The combination according to claim 3 in which said pawls are each mounted with sufficient positional freedom in the lengthwise dimension of the corresponding one of said shafts to allow low friction travel over said sawtooth ramps when said levers are drawn backward by said user.

13. The combination according to claim 8 in which said pawls are each mounted with sufficient positional freedom in the lengthwise dimension of the corresponding one of said shafts to allow low friction travel over said sawtooth ramps when said levers are drawn backward by said user.

14. The combination according to claim 12 including resilient means for biasing said pawls into the position consistent with contact with said sawtooth radial surfaces while permitting deflection thereof over said sawtooth ramps when said levers are drawn backward by said user.

15. The combination according to claim 3 in which each of said handles comprises a second hollow tube joined at one end and extending substantially horizontally from said corresponding lever upper end, a second shaft extending substantially concentrically within said second hollow tube and a gear arrangement coupling said shafts rotationally whereby rotation of said second shaft also rotates at first shaft, and selectively operable torque ratio control means at the other end of said second shaft for rotating said second shaft to select the torque ratio between said levers and said driven wheels.

16. The combination according to claim 4 in which each of said handles comprises a second hollow tube joined at one end and extending substantially horizontally from said corresponding lever upper end, a second shaft extending substantially concentrically within said second hollow tube and a gear arrangement coupling said shafts rotationally whereby rotation of said second shaft also rotates at first shaft, and selectively operable torque ratio control means at the other end of said second shaft for rotating said second shaft to select the torque ratio between said levers and said driven wheels.

17. The combination according to claim 8 in which each of said handles comprises a second hollow tube joined at one end and extending substantially horizontally from said corresponding lever upper end, a second shaft extending substantially concentrically within said second hollow tube and a gear arrangement coupling said shafts rotationally whereby rotation of said second shaft also rotates at first shaft, and selectively operable torque ratio control means at the other end of said second shaft for rotating said second shaft to select the torque ratio between said second shaft to select the torque ratio between said levers and said driven wheels.

18. The combination set forth in claim 3 in which generally horizontal members are fixed to said lever upward ends and said handles are in the form of tubular hand grip members mounted to be freely rotatable about said horizontal members thereby permitting a hand grip thereon independent of the instantaneous forward or backward position of said levers.

19. The combination set forth in claim 17 in which generally horizontal members are fixed to said lever upward ends and said handles are in the form of tubular hand grip members mounted to be freely rotatable about said horizontal members thereby permitting a hand grip thereon independent of the instantaneous forward or backward position of said levers.

20. The combination set forth in claim 15 further defined in that said selectively operable ratio control means include a pair of flat facing gears, one on the end of said second shaft and the other rotationally coupled to said hand grip for each of said levers, and user controlled means for momentarily engaging said flat gears to effect said second shaft rotation for changing said torque ratio.

* * * * *